US011136048B2

(12) United States Patent
Wang et al.

(10) Patent No.: US 11,136,048 B2
(45) Date of Patent: Oct. 5, 2021

(54) SYSTEM FOR SENSOR SYNCHRONIZATION DATA ANALYSIS IN AN AUTONOMOUS DRIVING VEHICLE

(71) Applicants: Baidu USA LLC, Sunnyvale, CA (US); Baidu.com Times Technology (Beijing) Co., Ltd., Beijing (CN)

(72) Inventors: Shuai Wang, Beijing (CN); Shuangcheng Guo, Beijing (CN); Xianfei Li, Beijing (CN); Chongchong Li, Beijing (CN); Jian Sheng, Sunnyvale, CA (US); Davy Huang, Sunnyvale, CA (US); Manjiang Zhang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 130 days.

(21) Appl. No.: 16/485,423

(22) PCT Filed: Jul. 22, 2019

(86) PCT No.: PCT/CN2019/097115
§ 371 (c)(1),
(2) Date: Aug. 12, 2019

(87) PCT Pub. No.: WO2021/012153
PCT Pub. Date: Jan. 28, 2021

(65) Prior Publication Data
US 2021/0024096 A1 Jan. 28, 2021

(51) Int. Cl.
*B60W 60/00* (2020.01)
*G06K 9/00* (2006.01)

(52) U.S. Cl.
CPC ...... *B60W 60/0051* (2020.02); *B60W 60/001* (2020.02); *G06K 9/00791* (2013.01); *B60W 2420/52* (2013.01); *B60W 2554/4048* (2020.02)

(58) Field of Classification Search
CPC .......... B60W 60/0051; B60W 60/001; B60W 2420/52; B60W 2554/4048; G06K 9/00791
See application file for complete search history.

(56) References Cited

U.S. PATENT DOCUMENTS

2011/0097014 A1* 4/2011 Lin ................ G01S 17/86
382/284
2018/0136314 A1 5/2018 Taylor et al.
(Continued)

FOREIGN PATENT DOCUMENTS

CN 106885601 6/2017
CN 109194436 1/2019
CN 109823325 5/2019

Primary Examiner — Thomas Ingram
(74) Attorney, Agent, or Firm — Womble Bond Dickinson (US) LLP

(57) ABSTRACT

The disclosure describes various embodiments for online system-level validation of sensor synchronization. According to an embodiment, an exemplary method of analyzing sensor synchronization in an autonomous driving vehicle (ADV) include the operations of acquiring raw sensor data from a first sensor and a second sensor mounted on the ADV, the raw sensor data describing a target object in a surrounding environment of the ADV; and generating an accuracy map based on the raw sensor data in view of timestamps extracted from the raw sensor data. The method further includes the operations of generating a first bounding box and a second bounding box around the target object using the raw sensor data; and performing an analysis of the first and second bounding boxes and the accuracy map using a (Continued)

predetermined algorithm in view of one or more pre-configured sensor settings to determine whether the first sensor and the second sensor are synchronized with each other.

21 Claims, 13 Drawing Sheets

(56) References Cited

U.S. PATENT DOCUMENTS

| | | | | |
|---|---|---|---|---|
| 2018/0204331 A1* | 7/2018 | Omari | .................... | G01S 13/878 |
| 2018/0356824 A1* | 12/2018 | Wang | .................... | G01S 7/4808 |
| 2018/0357314 A1* | 12/2018 | Wang | .................... | G01S 17/931 |
| 2018/0357503 A1* | 12/2018 | Wang | ...................... | G01C 21/26 |
| 2019/0065863 A1* | 2/2019 | Luo | ...................... | G06K 9/6267 |
| 2019/0066344 A1* | 2/2019 | Luo | ...................... | G06K 9/6215 |
| 2019/0120948 A1* | 4/2019 | Yang | .................... | G01C 21/165 |
| 2019/0294176 A1* | 9/2019 | Ozbilgin | .............. | G05D 1/0088 |
| 2019/0383941 A1* | 12/2019 | Siddiqui | ................. | G06T 7/521 |
| 2020/0225673 A1* | 7/2020 | Afrouzi | ................ | G05D 1/0214 |
| 2020/0327696 A1* | 10/2020 | Habib | ....................... | G06T 7/80 |

* cited by examiner

SYSTEM FOR SENSOR SYNCHRONIZATION DATA ANALYSIS IN AN AUTONOMOUS DRIVING VEHICLE

TECHNICAL FIELD

Embodiments of the present disclosure relate generally to operating autonomous vehicles. More particularly, embodiments of the disclosure relate to sensor synchronization validation.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

The onboard sensors need to be calibrated, synchronized, and fused for safe and stable control of an autonomous driving vehicle. Typically, timestamps on sensor data can be used to measure synchronization of the sensor data. This approach, however, only provides software level validation, and does not validate sensors and system hardware that provide data collection and transmission. Therefore, it would be desirable to have techniques that can be used to validate sensor data synchronization at a system-level and provide feedback for improving system-level synchronization accuracy.

SUMMARY

In a first aspect, embodiments of the present disclosure provide a computer-implemented method of analyzing sensor synchronization in an autonomous driving vehicle (ADV), including: acquiring raw sensor data from a first sensor and a second sensor mounted on the ADV, the raw sensor data describing a target object in a surrounding environment of the ADV; generating an accuracy map based on the raw sensor data and timestamps extracted from the raw sensor data; generating a first bounding box and a second bounding box around the target object using the raw sensor data; and performing an analysis of the first and second bounding boxes and the accuracy map using a predetermined algorithm in view of one or more pre-configured sensor settings to determine whether the first sensor and the second sensor are synchronized with each other.

In a second aspect, embodiments of the present disclosure provide a non-transitory machine-readable medium having instructions stored therein, which when executed by a processor, cause the processor to perform operations, the operations including acquiring raw sensor data from a first sensor and a second sensor mounted on the ADV, the raw sensor data describing a target object in a surrounding environment of the ADV; generating an accuracy map based on the raw sensor data and timestamps extracted from the raw sensor data; generating a first bounding box and a second bounding box around the target object using the raw sensor data; and performing an analysis of the first and second bounding boxes and the accuracy map using a predetermined algorithm in view of one or more pre-configured sensor settings to determine whether the first sensor and the second sensor are synchronized with each other.

In a third aspect, embodiments of the present disclosure provide a data processing system, including: a processor; and a memory coupled to the processor to store instructions, which when executed by the processor, cause the processor to perform operations, the operations including acquiring raw sensor data from a first sensor and a second sensor mounted on the ADV, the raw sensor data describing a target object in a surrounding environment of the ADV; generating an accuracy map based on the raw sensor data and timestamps extracted from the raw sensor data; generating a first bounding box and a second bounding box around the target object using the raw sensor data; and performing an analysis of the first and second bounding boxes and the accuracy map using a predetermined algorithm in view of one or more pre-configured sensor settings to determine whether the first sensor and the second sensor are synchronized with each other.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
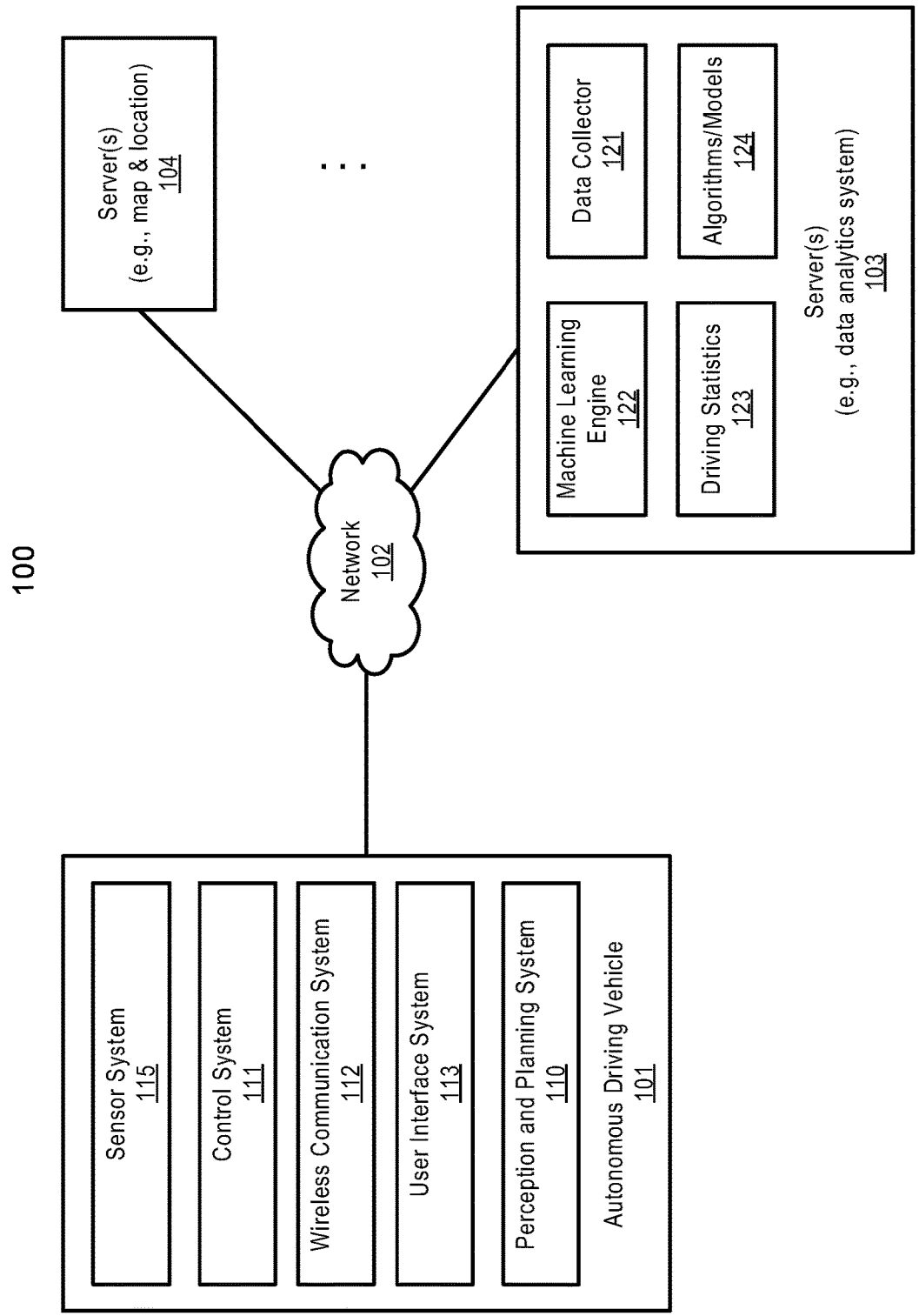
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The disclosure describes various embodiments for online system-level validation of sensor synchronization. According to an embodiment, an exemplary method of analyzing sensor synchronization in an autonomous driving vehicle (ADV) includes the operations of acquiring raw sensor data from a first sensor and a second sensor mounted on the ADV, the raw sensor data describing a target object in a surrounding environment of the ADV; and generating an accuracy map based on the raw sensor data in view of timestamps extracted from the raw sensor data. The method further includes the operations of generating a first bounding box and a second bounding box around the target object using the raw sensor data; and performing an analysis of the first and second bounding boxes and the accuracy map using a predetermined algorithm in view of one or more pre-configured sensor settings to determine whether the first sensor and second sensor are synchronized with each other.

In accordance with an embodiment, a synchronization validation module can be provided in the ADV to validate synchronization of onboard sensors and sensor data fusion at a system level. The software module can be coupled to a sensor system in the ADV, and acquire raw sensor data from the sensor system for analysis. Based on the raw sensor data, the synchronization validation module can detect what types of target objects the sensor system is detecting, and determine whether the raw sensor data has appropriate timestamps to synchronize with one another.

In one embodiment, the synchronization validation module generates an accuracy map for each target object to show alignment of different sensor data in view of their respective timestamps, and a bounding box surrounding the target object for sensor data from each type of sensor. The synchronization validation module can determine whether the different sensor data are aligned at an expected point given the type of target object, and whether the bounding boxes surrounding the target object match with one another. The bounding boxes can be cross-checked against the accuracy map to determine whether any mismatch area in the bounding boxes is expected.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113 and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
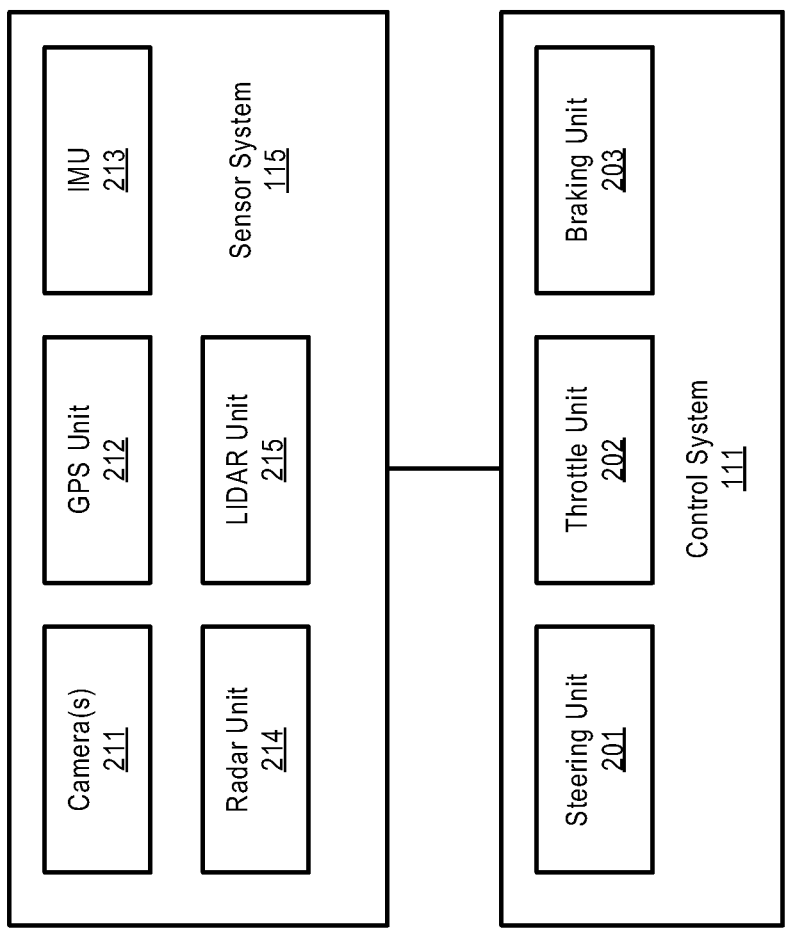
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS unit 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
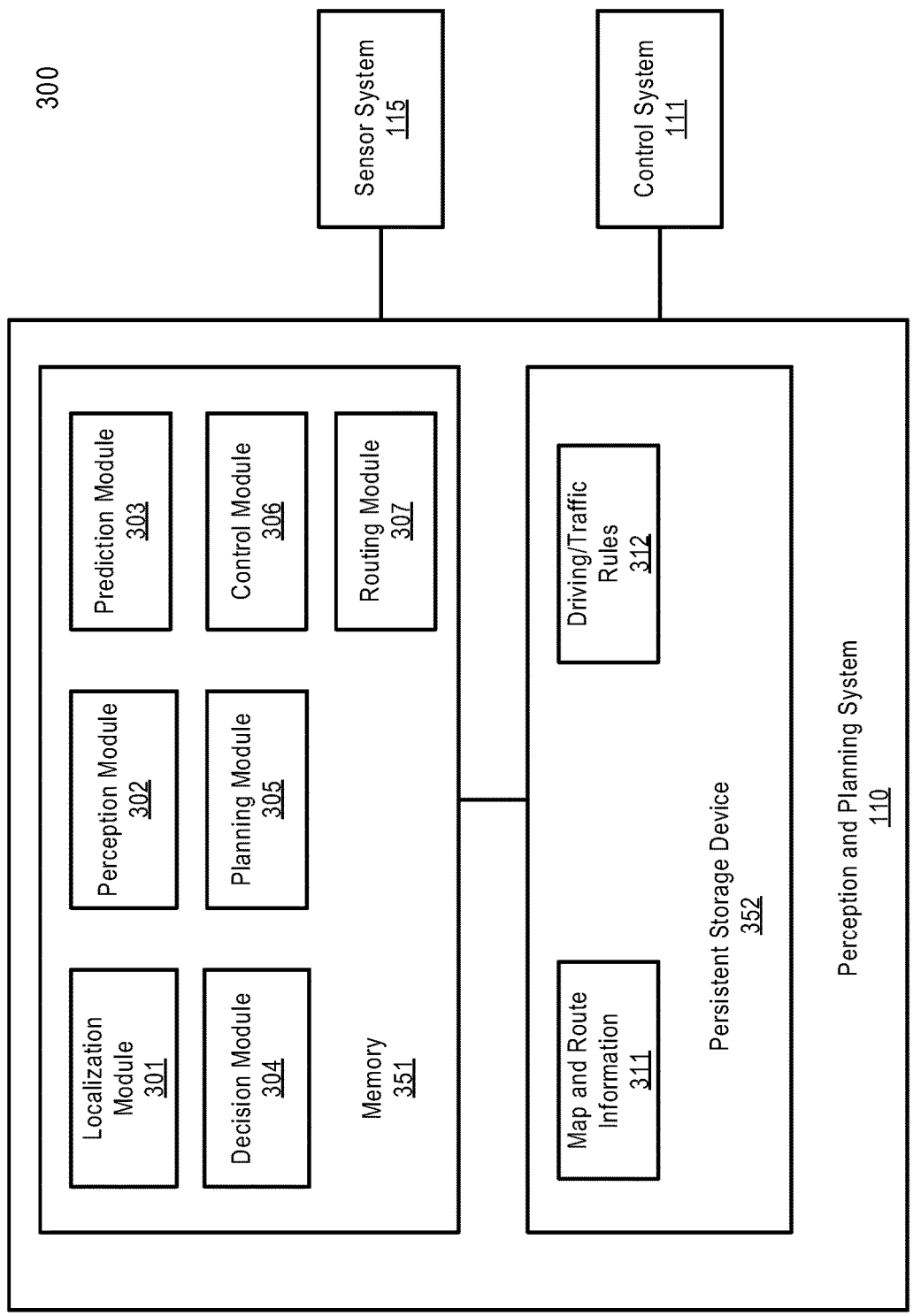
FIGS. 3A-3B are block diagrams illustrating an example of a perception and planning system used with an autonomous vehicle according to one embodiment.
Figure 3B:
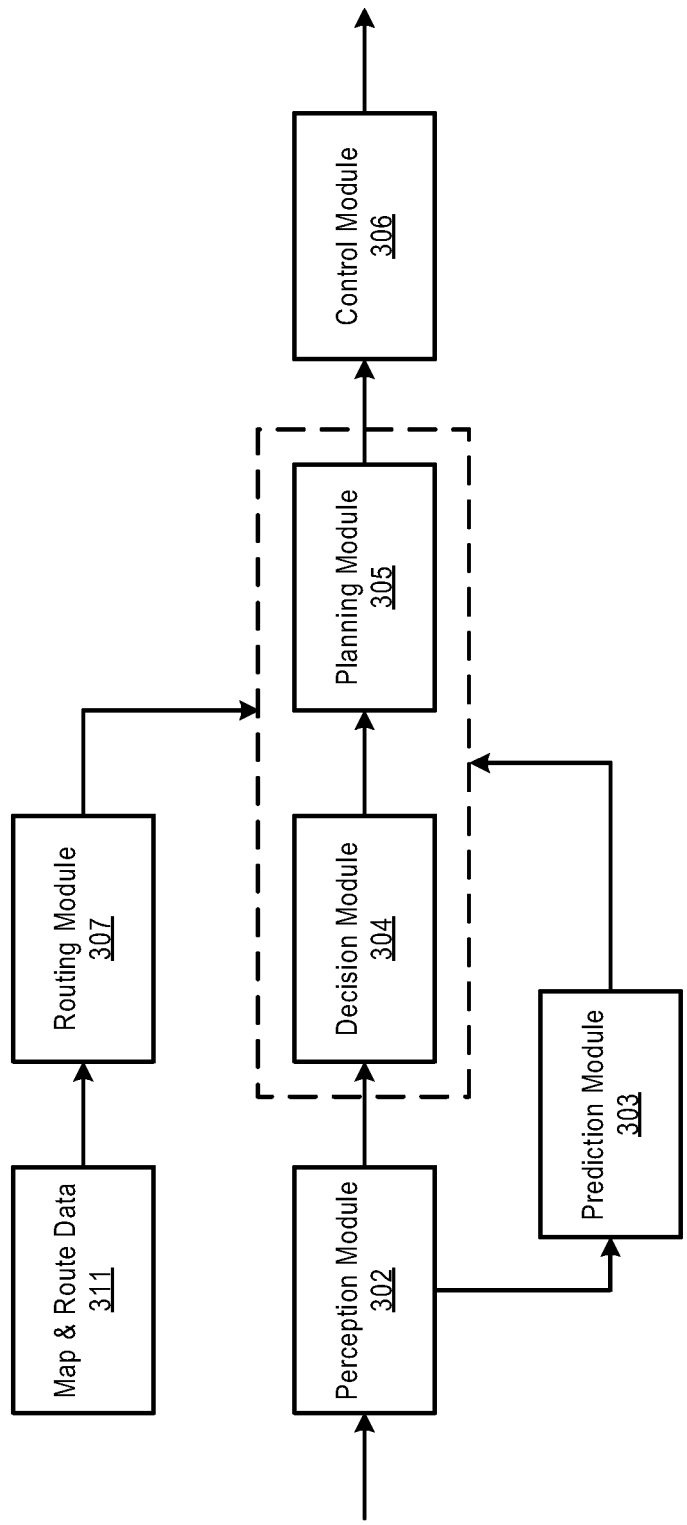

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
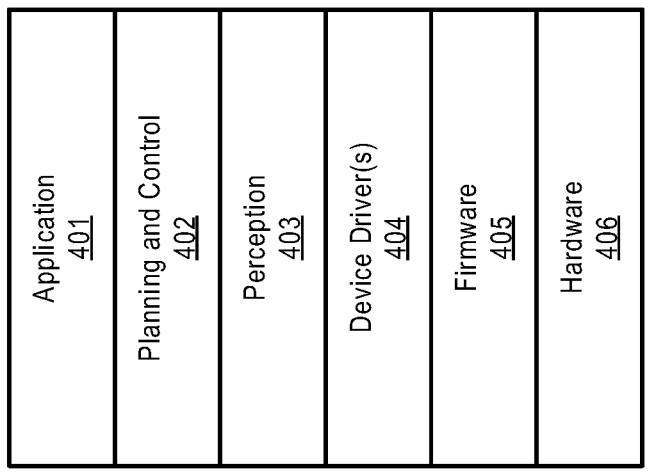
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
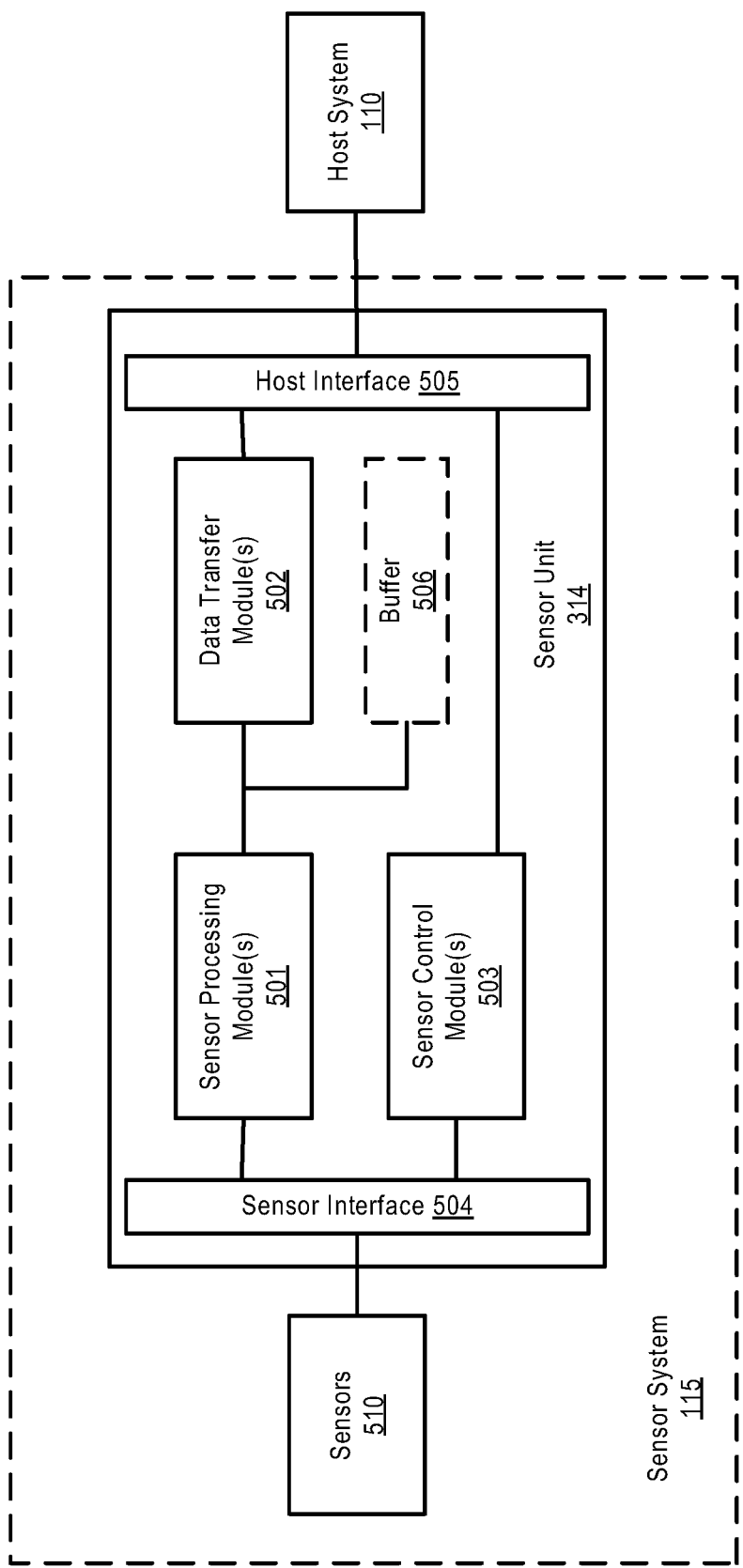
FIGS. 5A and 5B are block diagrams illustrating an example of a sensor unit according to one embodiment.

FIG. 5A is a block diagram illustrating an example of a sensor system according to one embodiment of the invention. Referring to FIG. 5A, sensor system 115 includes a number of sensors 510 and a sensor unit 314 coupled to host system 110. Host system 110 represents a planning and control system as described above, which may include at least some of the modules as shown in FIGS. 3A and 3B. Sensor unit 314 may be implemented in a form of an FPGA device or an ASIC (application specific integrated circuit) device. In one embodiment, sensor unit 314 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 314. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
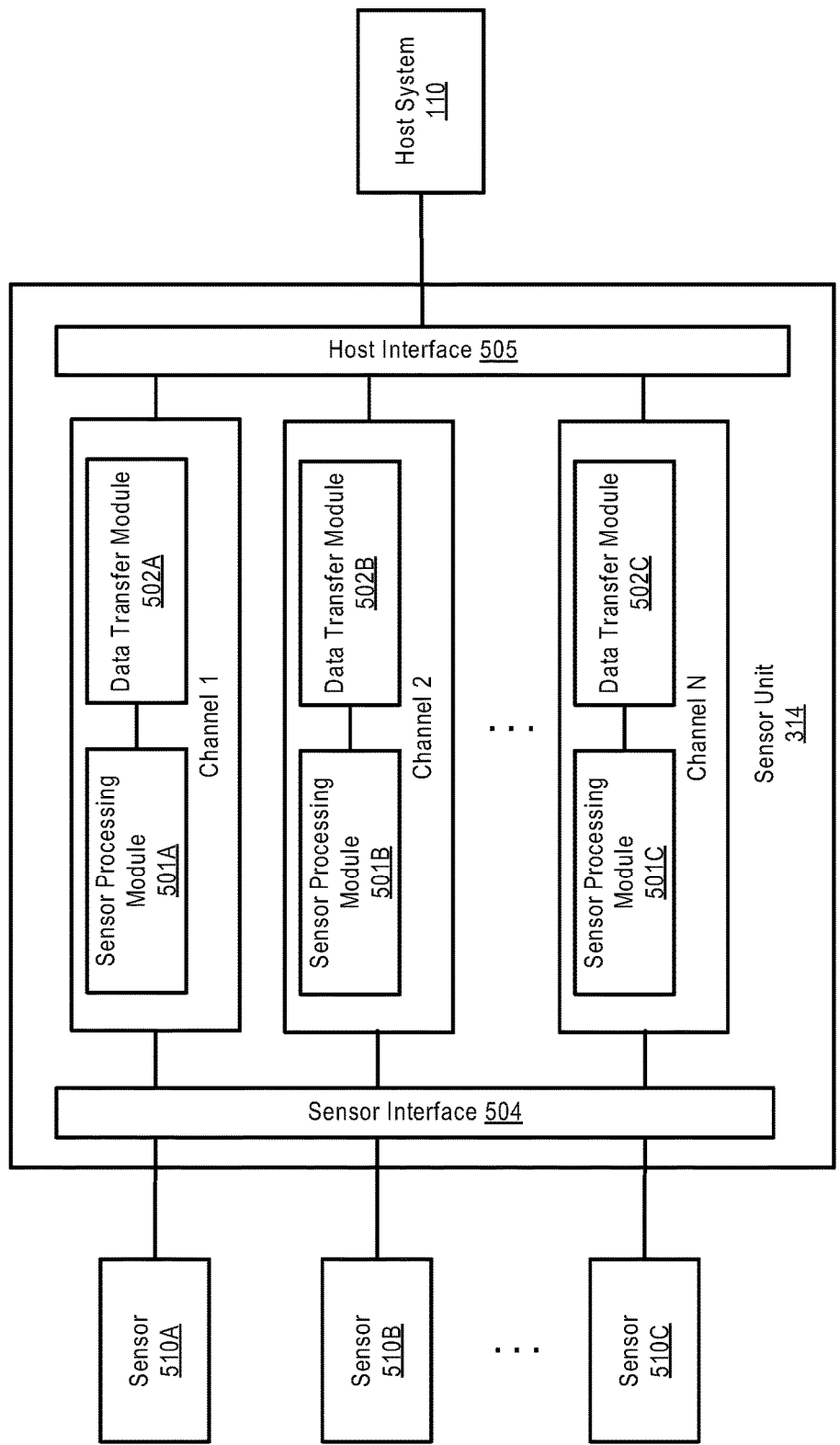

Referring now to FIG. 5B, sensor processing modules 501A-501C are specifically configured to process sensor data obtained from sensors 510A-510C respectively. Note that sensors 510A-510C may the same or different types of sensors. Sensor processing modules 501A-501C can be configured (e.g., software configurable) to handle different sensor processes for different types of sensors. For example, if sensor 510A is a camera, processing module 501A can be configured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 502A-502C can be configured to operate in different modes, as different kinds of sensor data may be in different size or sensitivities that require different speed or timing requirement. According to one embodiment, each of data transfer modules 502A-502C can be configured to operate in one of a low latency mode, a high bandwidth mode, and a memory mode (also referred to as a fixed memory mode).

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth of the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

The term of polynomial optimization or polynomial fit refers to the optimization of the shape of a curve (in this example, a trajectory) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

Sensor Synchronization Validation

Figure 6:
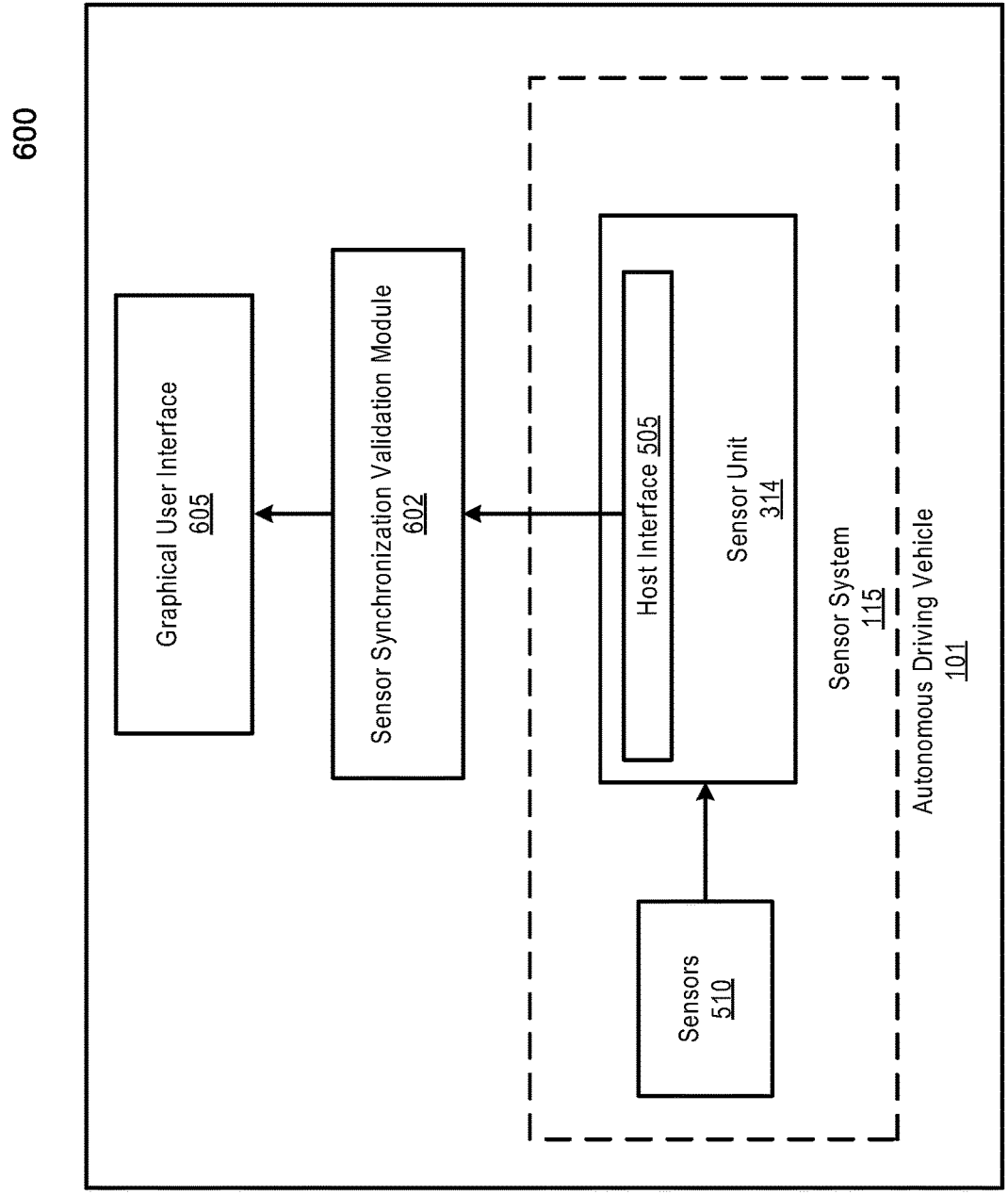
FIG. 6 illustrates an example system for validating sensor synchronization in an autonomous driving vehicle according to one embodiment.

FIG. 6 illustrates an example system 600 for validating sensor synchronization in an autonomous driving vehicle according to one embodiment.

As shown in FIG. 6, a sensor synchronization validation module 602 can receive, through the host interface 505, raw sensor data collected by the sensors 510. As described above, the sensors 510 can be configured by the host system 110 to capture sensor data in a collaborative and/or synchronized manner, such that the sensor data can be utilized to perceive a driving environment surrounding the vehicle at any point in time. The sensor data received by the sensor synchronization validation module 602 can be the same sensor data used by the host system 110 for detecting surrounding objects and environments.

The sensor system 115 includes the hardware sensors 510, and software components and hardware components for transmitting, processing, managing and synchronizing sensor data collected by the sensors 510. Therefore, in validating sensor data synchronization from the sensor system 115, the sensor synchronization validation module 602 can validate sensor data synchronization at a system-level. If the sensor data from any of the sensors 510 is unsynchronized with one or more other sensors, the sensor synchronization validation module can determine that the sensor system 115 has encountered errors in light of one or more predetermined thresholds. The errors can be displayed on a graphical user interface 605 in a variety of graphs, figures and charts, for a user to visually determine that the sensor system needs to be improved.

Figure 7:
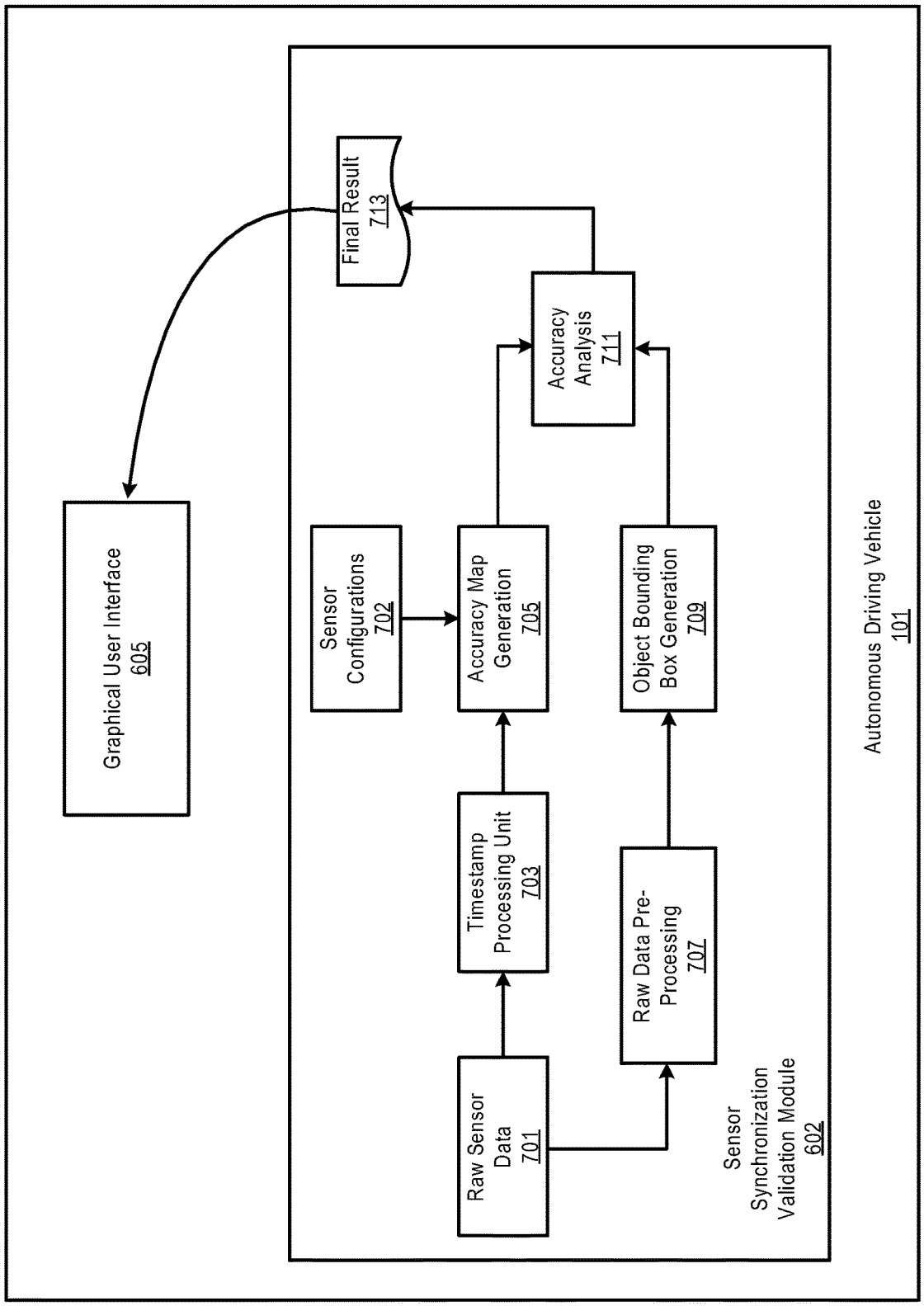
FIG. 7 further illustrates the example system shown in FIG. 6 in an autonomous driving vehicle according to one embodiment.

FIG. 7 further illustrates the example system 600 for validating sensor synchronization in an autonomous driving vehicle according to one embodiment.

As shown in FIG. 7, the sensor synchronization validation module 602 can implement an algorithm for validating raw sensor data 701 from the sensor unit 314. As used herein, in one embodiment, synchronizing sensor data includes receiving a set of data points from the sensors 510, assigning the set of data points one or more timestamp values, and aggregating the sets of data points and their assigned timestamp values into an aggregated sensor dataset that represents the sets of data points over a particular period of time.

The raw sensor data 701 from the sensor unit 314 can be synchronized sensor data. By analyzing the synchronized sensor data using the predetermined algorithm, the sensor synchronization validation module 602 can determine the sensors are synchronized.

As further shown in FIG. 7, the sensor synchronization validation module 602 can preprocess 707 the raw sensor data 701, including finding missing sensor data, detecting error data, and repairing both of them. The sensor synchronization validation module 602 can then generate 709 a bounding box using sensor data from a number of sensors. For example, the sensor synchronization validation module 602 can execute one set of instructions on one of a number of current threads to generate a 2-D bounding box surrounding a target object using sensor data from a camera, and a 3-D bounding box surrounding the target object using sensor data from a LiDAR device.

The sensor synchronization validation module 602 can execute another set of instructions on another of the number concurrent threads to extract timestamps using a timestamp processing unit 703 from the raw sensor data, and generate 705 an accuracy map based on the raw sensor data in view of timestamps extracted from the raw sensor data.

In one embodiment, an accuracy map can show sensor data from a LiDAR device and sensor data from a rolling shutter camera. The accuracy map can represent an image captured by the camera, and can show vertical scan lines of the LiDAR device, horizontal scan lines of the rolling shutter camera, and capture timestamp differences between the LiDAR device and the camera.

As a rolling shutter camera, the camera can expose an image frame of a target object line after line. The number of exposures equals the number of lines in the image frame. Each frame line represents a row of pixel in the image frame.

The frame lines can be equally-spaced parallel lines, with a fixed (e.g., 3 milliseconds) offset in between. The camera may also have a trigger delay parameter, which indicates a delay between a given trigger signal and the image capture. A trigger delay can be a positive, zero, or negative. If a trigger delay is zero, the camera starts to take the first frame line of the image of the measure board immediately after the trigger signal. If the trigger delay is negative, the camera can start to capture the first frame line of the image of the measure board prior to the trigger signal. If the trigger delay is positive, the camera can start to capture the first frame line of the image of the measure board after a time delay as specified by the trigger delay.

In one embodiment, the camera and the LiDAR device are aligned, with the image center of the camera matching the center of the field of view (FOV) of the LiDAR device. The FOV of the LiDAR device and the image center of the camera can both be fixed. Therefore, by default, the LiDAR device and the camera are synchronized at the image center of the camera. However, sensor configurations 702 can configure where the LiDAR device and the camera need to be synchronized based on types of target objects the LiDAR device is detecting. The sensor configuration 702 can be dynamically changed by the host system 110 as the ADV is travelling in the real-time environment.

In one embodiment, the sensor configurations 702 can specify a target area of the LiDAR device and a corresponding trigger delay for a camera, which would cause a synchronization point between the camera and the LiDAR device to match the target area specified in the sensor configurations 702.

For example, in real-time driving, when the autonomous driving vehicle 101 is waiting at red traffic lights, the target area of the LiDAR device can be above the image center of the camera. When the LiDAR device is detecting another vehicle, the target area of the LiDAR device can at the image center of the camera.

With a given trigger delay and/or a given time offset between frame lines of the camera, the camera can capture scan lines of the LiDAR device at a different point of time at a particular area of the target object. The area where the camera captures the LiDAR scan lines is a synchronization point, where the LiDAR device and the camera capture data of the target object at the same time.

In one embodiment, the sensor synchronization validation module 602 can invoke an analysis component to perform an analysis 711 of the accuracy map, to determine whether the LiDAR device and the camera are synchronized at an expected target area based on the dynamically changed sensor configurations 702.

For example, a trained neural network can be used by the analysis component for pattern recognition and classification. The trained neural network can also validate whether the 2-D bounding box and the 3-D bounding box match each other; and if not, whether the mismatch portion is expected based on the sensor configurations 702. Further, the neural network model can compare the bounding boxes against the accuracy map to determine whether any mismatch portion between the bounding boxes correspond to an area on the accuracy map with discrepancies in capture timestamps between scan lines of the LiDAR device and the frame line of the camera. A final result 713 summarizing the analysis can be displayed to the graphical user interface 605.

Figure 8A:
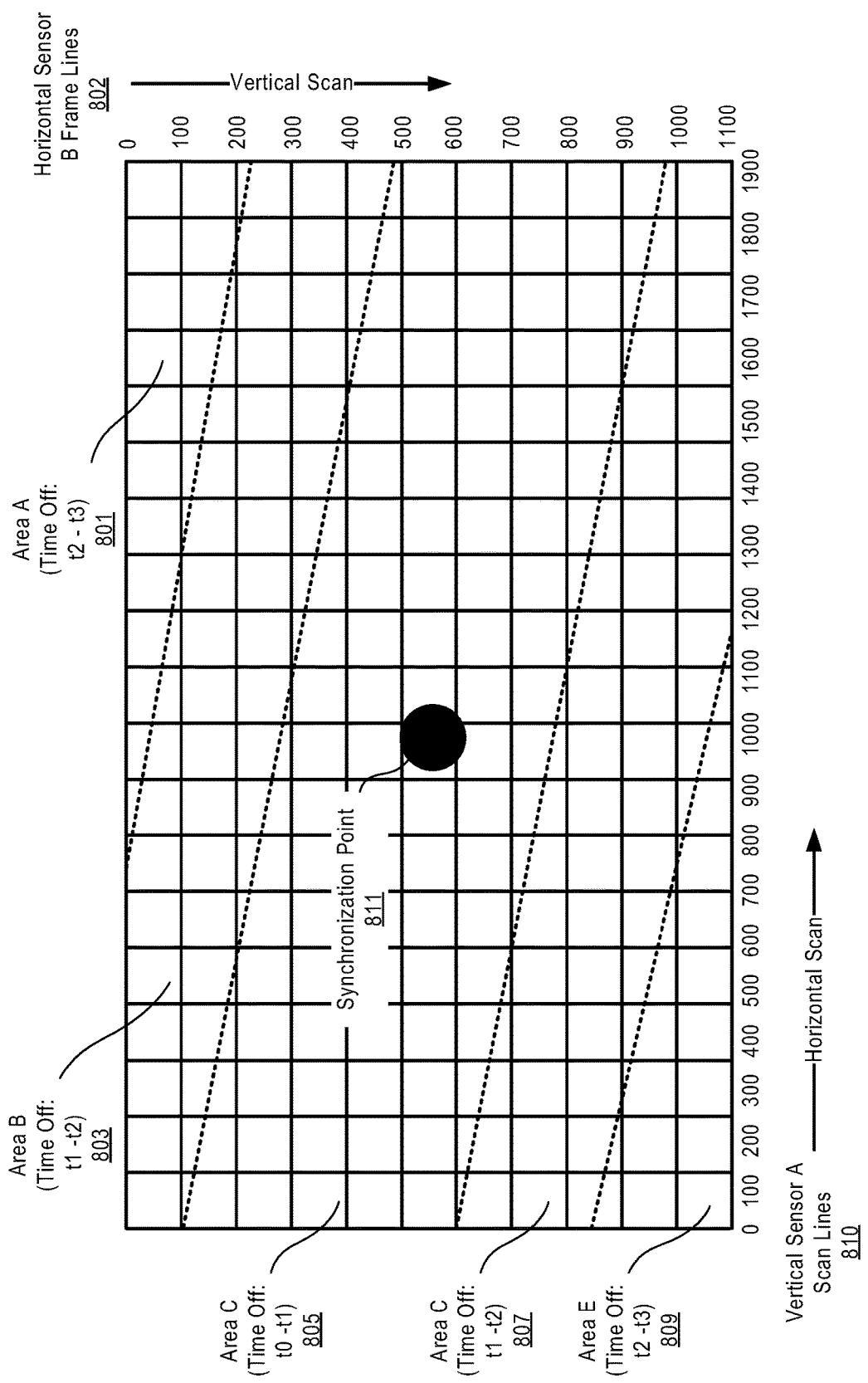
FIG. 8A and FIG. 8B illustrate example accuracy maps according to some embodiments.
Figure 8B:
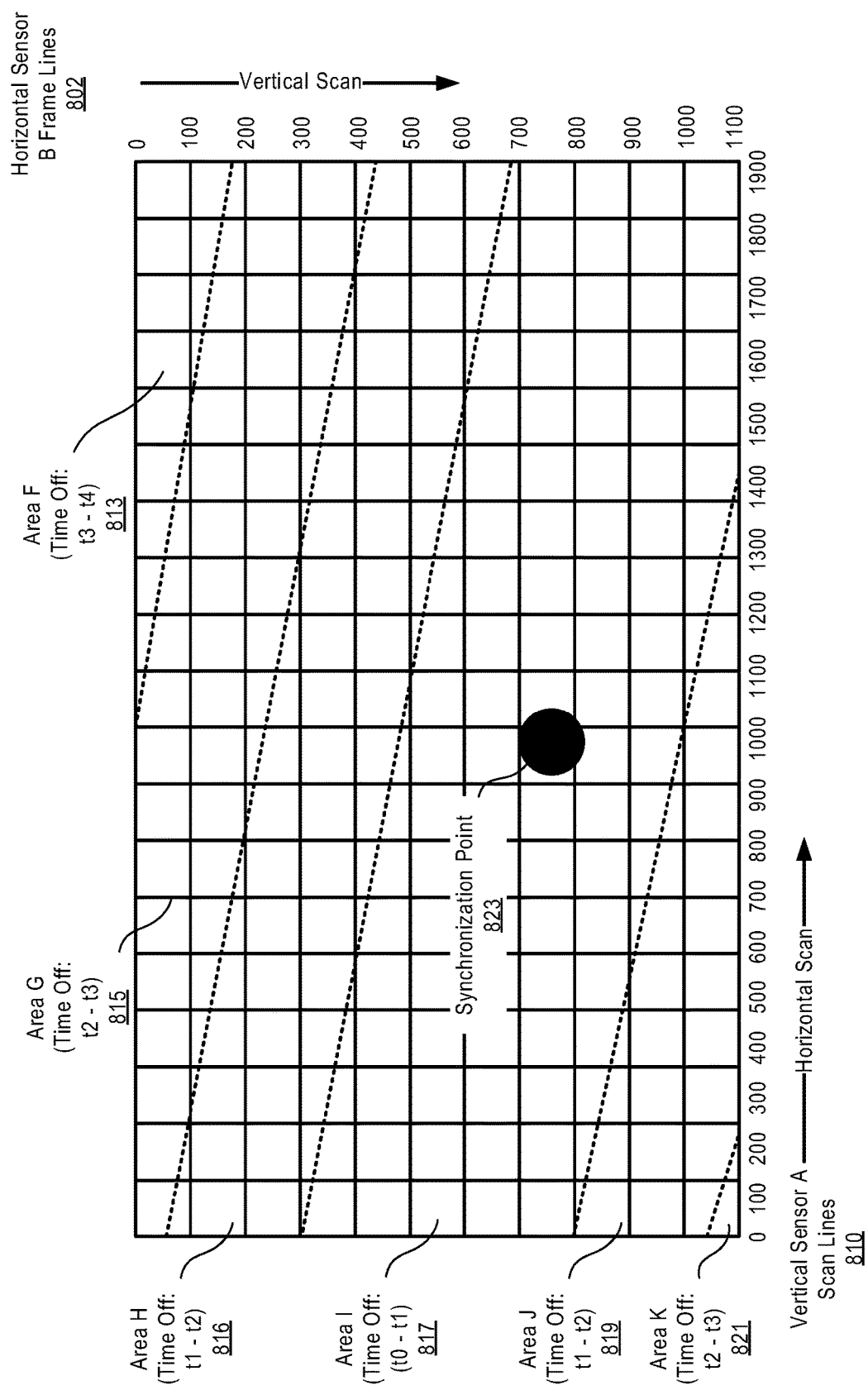

FIG. 8A and FIG. 8B illustrate example accuracy maps according to some embodiments.

In FIG. 8A, an example accuracy map shows a distribution of sensor A scan lines 810, sensor B frame lines 802, and capture timestamp differences between sensor A scan lines and sensor B frame lines. Sensor A can be a LIDAR device and sensor B can be a rolling shutter camera. The accuracy map can be an image captured by sensor B. In this example, sensor A is configured to perform a horizontal scan from left to right, generating the vertical scan lines 810, while sensor B is configured to scan vertically from top to bottom, generating the horizontal frame lines 802. There can be a given time offset (e.g., 5 milliseconds) between two adjacent LiDAR scan lines. Similarly, there can a given time offset (e.g., 6 milliseconds) between two adjacent camera frame lines.

Sensor A and sensor B are configured to align with each other, with the center of the field of view of sensor A matching the image center of sensor B. Therefore, by default, sensor A and sensor B are synchronized at the image center of sensor B. However, by adjusting the trigger delay parameter of sensor B, sensor A and sensor B can be synchronized at a position above or below the image center of sensor B, depending on a target area (i.e., region of interest or ROI).

For example, in FIG. 8A, the target area is at the image center of sensor B. In a real-time driving environment, this scenario can happen when sensor A is scanning a target object (e.g., another vehicle or another object) with approximately the same height with sensor A mounted on the ego ADV. Accordingly, the synchronization point 811 between sensor A and sensor B can be at the image center of sensor B.

As further shown in FIG. 8A, in area C 805, the capture timestamp differences between sensor A and sensor B can range from t0-t1 milliseconds. In one example, at the synchronization point 811, sensor A and sensor B can capture the target object simultaneously, with 0 differences in capture timestamps; in other portions of Area C 805, the capture timestamp differences between sensor A and sensor B can be off by up to t1 milliseconds.

The further away from the center of the image, the greater the capture timestamp differences between sensor A and sensor B. For example, in area A 801 and area E 809, the capture timestamp differences can be t2-t3 milliseconds; in area B 803 and area D 807, the capture timestamp differences can be t1-t2 milliseconds.

In FIG. 8B, the same sensor A and sensor B shown in FIG. 8A are synchronized with each other at a synchronization point 823, which is 200 camera frame lines below the image center of sensor B. Accordingly, in area I 817, the capture timestamp differences are t0-t1 milliseconds. Areas that are further away from the synchronization point 823 can have greater differences in capture timestamp differences. For example, in area H 816 and area J 819, the capture timestamp differences can be t1-t2 milliseconds; in area G 815 and area K 821, the capture timestamp differences can be t2-t3 milliseconds; and in area F 813, the capture timestamp differences can be t3-t4 milliseconds.

Figure 9:
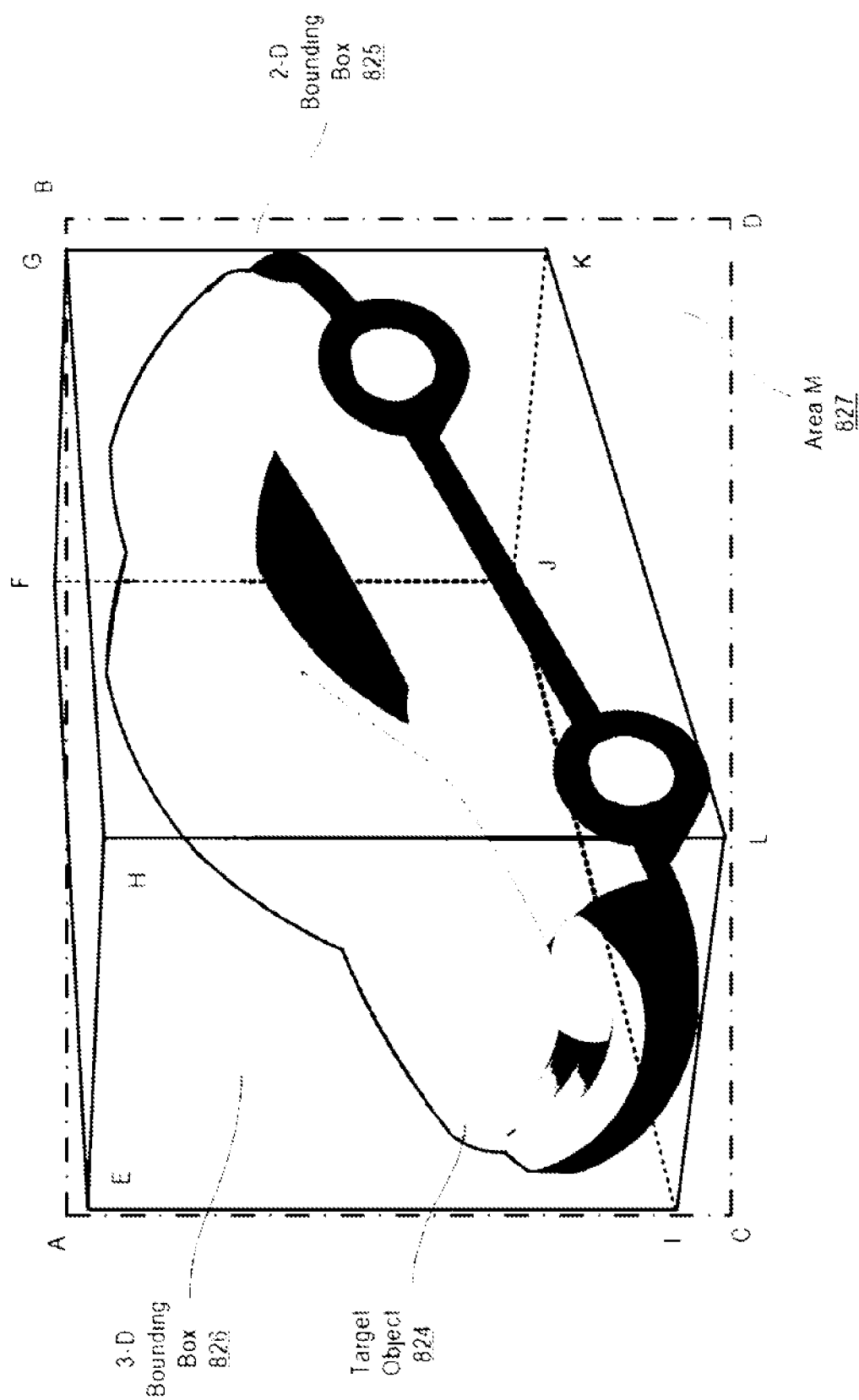
FIG. 9 illustrates example bounding boxes surrounding a target object according to one embodiment.

FIG. 9 illustrates example bounding boxes surrounding a target object according to one embodiment.

In the illustrative example, a 2-D bounding box ABCD 825 surrounding a target object 824 can be generated based sensor data from a camera, while a 3-D bounding box EFGHIJKL 826 surrounding the target object 824 can be generated based on sensor data from a LiDAR device.

In one embodiment, a sensor synchronization validation module, such as the validation module 602, can create the bounding boxes 825 and 826 and the accuracy map in FIG. 8A using the set of sensor data. Therefore, the bounding boxes 825 and 826 and the accuracy map can be compared by the sensor synchronization validation module to determine if any mismatch portion (e.g., area M 827) can be explained by the capture timestamp differences illustrated in FIG. 8A. If the mismatch portion corresponds to one or more areas with significant timestamp differences, the sensor synchronization validation module can determine that the LiDAR device and the camera are synchronized.

Figure 10:
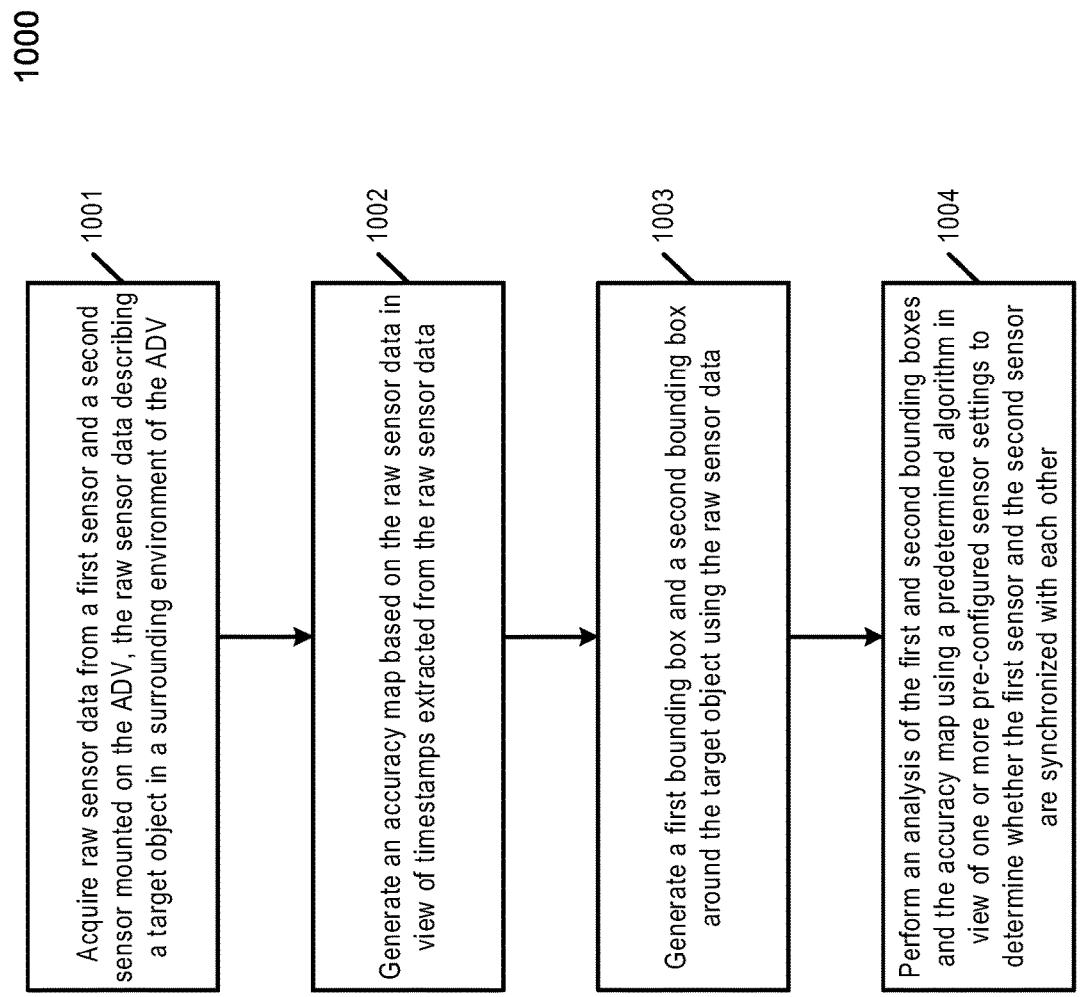
FIG. 10 illustrates an example process of validating sensor synchronization in an autonomous driving vehicle according to one embodiment.

FIG. 10 illustrates an example process 1000 of validating sensor synchronization in an autonomous driving vehicle according to one embodiment. Process 1000 may be performed by processing logic which may include software, hardware, or a combination thereof. For example, process 1000 may be performed by the sensor synchronization validation module 602 described in FIG. 6 and FIG. 7.

Referring to FIG. 10, in operation 1001, the processing logic acquires raw sensor data from a first sensor and a second sensor mounted on the ADV, the raw sensor data describing a target object in a surrounding environment of the ADV. In operation 1002, the processing logic generates an accuracy map based on the raw sensor data in view of timestamps extracted from the raw sensor data. In operation 1003, the processing logic generates a first bounding box and a second bounding box around the target object using the raw sensor data. In operation 1004, the processing logic performs an analysis of the first and second bounding boxes and the accuracy map using a predetermined algorithm in view of one or more pre-configured sensor settings to determine whether the first sensor and the second sensor are synchronized with each other.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implemented method of analyzing sensor synchronization in an autonomous driving vehicle (ADV), comprising:
   acquiring raw sensor data from a first sensor and a second sensor mounted on the ADV, the raw sensor data describing a target object in a surrounding environment of the ADV;
   generating an accuracy map based on the raw sensor data and timestamps extracted from the raw sensor data;
   generating a first bounding box and a second bounding box around the target object using the raw sensor data; and
   performing an analysis of the first and second bounding boxes and the accuracy map using a predetermined algorithm in view of one or more pre-configured sensor settings to determine whether the first sensor and the second sensor are synchronized with each other.

2. The method of claim 1, wherein the first sensor is a camera and the second sensor is a light detection and ranging (LiDAR) device.

3. The method of claim 2, wherein the one or more pre-configured sensor settings include a scan direction for the camera and a scan direction for the LiDAR device.

4. The method of claim 2, wherein performing the analysis further comprises:
   determining whether a first piece of raw sensor data from the camera and a second piece of raw sensor data from the LiDAR device align with each other at a predetermined synchronization point in view of their respective acquisition timestamps.

5. The method of claim 4, wherein the synchronization point is determined based on a type of the target object.

6. The method of claim 2, wherein the first bounding box is a 2-D bounding box generated based on a first piece of sensor data from the camera, and wherein the second bounding box is a 3-D bounding box generated based on a second piece of sensor data from the LiDAR device.

7. The method of claim 2, wherein performing the analysis further comprises:
 determining whether the first bounding box and the second bounding box match each other.

8. A non-transitory machine-readable medium having instructions stored therein, which when executed by a processor, cause the processor to perform operations, the operations comprising:
 acquiring raw sensor data from a first sensor and a second sensor mounted on an ADV, the raw sensor data describing a target object in a surrounding environment of the ADV;
 generating an accuracy map based on the raw sensor data in view of timestamps extracted from the raw sensor data;
 generating a first bounding box and a second bounding box around the target object using the raw sensor data; and
 performing an analysis of the first and second bounding boxes and the accuracy map using a predetermined algorithm in view of one or more pre-configured sensor settings to determine whether the first sensor and the second sensor are synchronized with each other.

9. The non-transitory machine-readable medium of claim 8, wherein the first sensor is a camera and the second sensor is a light detection and ranging (LiDAR) device.

10. The non-transitory machine-readable medium of claim 9, wherein the one or more pre-configured sensor settings include a scan direction for the camera and a scan direction for the LiDAR device.

11. The non-transitory machine-readable medium of claim 9, wherein performing the analysis further comprises:
 determining whether a first piece of raw sensor data from the camera and a second piece of raw sensor data from the LiDAR device align with each other at a predetermined synchronization point in view of their respective acquisition timestamps.

12. The non-transitory machine-readable medium of claim 11, wherein the synchronization point is determined based on a type of the target object.

13. The non-transitory machine-readable medium of claim 9, wherein the first bounding box is a 2-D bounding box generated based on a first piece of sensor data from the camera, and wherein the second bounding box is a 3-D bounding box generated based on a second piece of sensor data from the LiDAR device.

14. The non-transitory machine-readable medium of claim 9, wherein performing the analysis further comprises:
 determining whether the first bounding box and the second bounding box match each other.

15. A data processing system, comprising:
 a processor; and
 a memory coupled to the processor to store instructions, which when executed by the processor, cause the processor to perform operations, the operations including
  acquiring raw sensor data from a first sensor and a second sensor mounted on an ADV, the raw sensor data describing a target object in a surrounding environment of the ADV;
  generating an accuracy map based on the raw sensor data in view of timestamps extracted from the raw sensor data;
  generating a first bounding box and a second bounding box around the target object using the raw sensor data; and
  performing an analysis of the first and second bounding boxes and the accuracy map using a predetermined algorithm in view of one or more pre-configured sensor settings to determine whether the first sensor and the second sensor are synchronized with each other.

16. The system of claim 15, wherein the first sensor is a camera and the second sensor is a light detection and ranging (LiDAR) device.

17. The system of claim 16, wherein the one or more pre-configured sensor settings include a scan direction for the camera and a scan direction for the LiDAR device.

18. The system of claim 16, wherein performing the analysis further comprises:
 determining whether a first piece of raw sensor data from the camera and a second piece of raw sensor data from the LiDAR device align with each other at a predetermined synchronization point in view of their respective acquisition timestamps.

19. The system of claim 18, wherein the synchronization point is determined based on a type of the target object.

20. The system of claim 16, wherein the first bounding box is a 2-D bounding box generated based on a first piece of sensor data from the camera, and wherein the second bounding box is a 3-D bounding box generated based on a second piece of sensor data from the LiDAR device.

21. The system of claim 16, wherein performing the analysis further comprises:
 determining whether the first bounding box and the second bounding box match each other.

* * * * *